US011373331B2

(12) United States Patent
Huelsdunk et al.

(10) Patent No.: US 11,373,331 B2
(45) Date of Patent: Jun. 28, 2022

(54) SYSTEM, METHOD AND COMPUTER PROGRAM PRODUCT FOR DETERMINING SIZES AND/OR 3D LOCATIONS OF OBJECTS IMAGED BY A SINGLE CAMERA

(71) Applicant: AGT International GmbH, Zurich (CH)

(72) Inventors: Philipp Huelsdunk, Frankfurt (DE); Robert Biehl, Darmstadt (DE); Markus Schlattmann, Griesheim (DE)

(73) Assignee: AGT INTERNATIONAL GMBH, Zurich (CH)

( * ) Notice: Subject to any disclaimer, the term of this patent is extended or adjusted under 35 U.S.C. 154(b) by 102 days.

(21) Appl. No.: 16/719,553

(22) Filed: Dec. 18, 2019

(65) Prior Publication Data
US 2021/0192783 A1 Jun. 24, 2021

(51) Int. Cl.
  *G06T 7/73* (2017.01)
  *G06T 7/77* (2017.01)
  *G06T 1/60* (2006.01)

(52) U.S. Cl.
  CPC .................. *G06T 7/75* (2017.01); *G06T 1/60* (2013.01); *G06T 7/77* (2017.01); *G06T 2207/10016* (2013.01)

(58) Field of Classification Search
  CPC ... G06T 2207/10016; G06T 7/77; G06T 1/60; G06T 7/75; G06T 7/73; G06T 2207/20081; G06T 2207/20084; G06T 2207/30221; G06T 7/246; G06T 2207/30196
  See application file for complete search history.

(56) References Cited

U.S. PATENT DOCUMENTS

| 9,058,663 B2 | 6/2015 | Andriluka et al. |
| 2008/0152191 A1 | 6/2008 | Fujimura et al. |
| 2011/0135157 A1 | 6/2011 | Cho et al. |
| 2011/0267344 A1 | 11/2011 | Germann et al. |
| 2012/0105585 A1* | 5/2012 | Masalkar ............. H04N 13/271 348/46 |
| 2013/0271458 A1* | 10/2013 | Andriluka ................ G06T 7/55 345/420 |

(Continued)

FOREIGN PATENT DOCUMENTS

| EP | 2383696 A1 | 11/2011 |
| EP | 2674913 A1 | 12/2013 |

OTHER PUBLICATIONS

Metzler, Jurgen, and Frank Pagel. "3D Trajectory Reconstruction of the Soccer Ball for Single Static Camera Systems." MVA. 2013.

(Continued)

*Primary Examiner* — Siamak Harandi
(74) *Attorney, Agent, or Firm* — Browdy and Neimark, PLLC

(57) ABSTRACT

A system, method or computer program product for estimating an absolute 3D location of at least one object x imaged by a single camera, the system including processing circuitry configured for identifying an interaction, at time t, of object x with an object y imaged with said object x by said single camera, typically including logic for determining object y's absolute 3D location at time t, and providing an output indication of object x's absolute location at time t, derived from the 3D location, as known, at time t, of object y.

20 Claims, 4 Drawing Sheets

(56) References Cited

U.S. PATENT DOCUMENTS

| | | | | |
|---|---|---|---|---|
| 2014/0334670 | A1* | 11/2014 | Guigues | G06K 9/469 |
| | | | | 382/103 |
| 2020/0134911 | A1* | 4/2020 | van Hoff | G06T 13/20 |
| 2021/0097718 | A1* | 4/2021 | Fisch | G06K 9/00342 |
| 2021/0158630 | A1* | 5/2021 | Muhammad | G06F 3/016 |

OTHER PUBLICATIONS

Find distance from camera to object/marker using Python and OpenCV, downloaded from https://www.pyimagesearch.com/2015/01/19/find-distance-camera-objectmarker-using-python-opencv/ (Jan. 19, 2015).

https://github.com/vishaltiwari/bmvc-tennis-analytics (Jun. 13, 2018).

Lobo, Jorge, and Jorge Dias. "Ground plane detection using visual and inertial data fusion." Proceedings. 1998 IEEE/RSJ International Conference on Intelligent Robots and Systems. Innovations in Theory, Practice and Applications (Cat. No. 98CH36190). vol. 2. IEEE, 1998.

Alatise, Mary B., and Gerhard P. Hancke. "Pose estimation of a mobile robot based on fusion of IMU data and vision data using an extended Kalman filter." Sensors 17.10 (2017): 2164.

Sun, Xinghua, Mingyu Chen, and Alexander Hauptmann. "Action recognition via local descriptors and holistic features." 2009 IEEE Computer Society Conference on Computer Vision and Pattern Recognition Workshops. IEEE, 2009.

Li, Sijin, and Antoni B. Chan. "3D human pose estimation from monocular images with deep convolutional neural network." Asian Conference on Computer Vision. Springer, Cham, 2014.

Tekin, Bugra, et al. "Structured prediction of 3D human pose with deep neural networks " arXiv preprint arXiv:1605.05180 (2016).

Mehta, Dushyant, et al. "Vnect: Real-time 3D human pose estimation with a single rgb camera." ACM Transactions on Graphics (TOG) 36.4 (2017): 44.

Lin, Mude, et al. "Recurrent 3D pose sequence machines." Proceedings of the IEEE Conference on Computer Vision and Pattern Recognition. 2017.

Tome, Denis, Chris Russell, and Lourdes Agapito. "Lifting from the deep: Convolutional 3D pose estimation from a single image." Proceedings of the IEEE Conference on Computer Vision and Pattern Recognition. 2017.

Zhou, Xingyi, et al. "Towards 3D human pose estimation in the wild: a weakly-supervised approach." Proceedings of the IEEE International Conference on Computer Vision. 2017.

Sun, Xiao, et al. "Integral human pose regression." Proceedings of the European Conference on Computer Vision (ECCV). 2018.

Martinez, Julieta, et al. "A simple yet effective baseline for 3d human pose estimation." Proceedings of the IEEE International Conference on Computer Vision. 2017.

Pavllo, Dario, et al. "3D human pose estimation in video with temporal convolutions and semi-supervised training." arXiv preprint arXiv:1811.11742 (2018).

Zhang. A Flexible New Technique for Camera Calibration. IEEE Transactions on Pattern Analysis and Machine Intelligence, 22(11):1330-1334, 2000.

Nath, Tanmay, et al. "Using DeepLabCut for 3D markerless pose estimation across species and behaviors." Nature protocols (2019).

Doosti, Bardia. "Hand Pose Estimation: A Survey." arXiv preprint arXiv:1903.01013 (2019).

Malik, Jameel, Ahmed Elhayek, and Didier Stricker. "Simultaneous hand pose and skeleton bone-lengths estimation from a single depth image." 2017 International Conference on 3D Vision (3DV). IEEE, 2017.

Li, Ruotong, et al. "Constraint-Based Optimized Human Skeleton Extraction from Single-Depth Camera." Sensors 19.11 (2019): 2604.

Nageli, Tobias, et al. "Flycon: real-time environment-independent multi-view human pose estimation with aerial vehicles " Siggraph Asia 2018 Technical Papers. ACM, 2018.

Arnab, Anurag, Carl Doersch, and Andrew Zisserman. "Exploiting temporal context for 3D human pose estimation in the wild." Proceedings of the IEEE Conference on Computer Vision and Pattern Recognition. 2019.

Singhal, Shivam, and Vikas Tripathi. "Action recognition framework based on normalized local binary pattern." Progress in Advanced Computing and Intelligent Engineering. Springer, Singapore, 2019. 247-255.

CMU-Perceptual-Computing-Lab/openpose, downloaded from https://github.com/CMU-Perceptual-Computing-Lab/openpose (Nov. 5, 2019).

Bertinetto, Luca, et al. "Fully-convolutional Siamese networks for object tracking." European conference on computer vision. Springer, Cham, 2016. Jackman, Simeon. "Football Shot Detection using Convolutional Neural Networks." (2019).

Downloaded from https://blog.markdaws.net/arkit-by-example-part-2-plane-detection-visualization-10f05876d53 (Jun. 11, 2017).

Downloaded from ttp://www.cse.psu.edu/~rtc12/CSE486/lecture12.pdf (Oct. 25, 2018).

Hessian Normal Form, downloaded from http://mathworld.wolfram.com/HessianNormalForm.html (Nov. 17, 2019).

Camera Calibration and 3D Reconstruction, downloaded from https://docs.opencv.org/2.4/modules/calib3d/doc/camera_calibration_and_3d_reconstruction.html (Jul. 12, 2019).

Reprojection Error, downloaded from https://en.wikipedia.org/wiki/Reprojection_error (Oct. 16, 2019).

Mehta, Dushyant, et al. "Monocular 3d human pose estimation in the wild using improved cnn supervision." 2017 International Conference on 3D Vision (3DV). IEEE, 2017.

Video Tracking, downloaded from https://en.wikipedia.org/wiki/Video_tracking (Aug. 27, 2019).

Agahian, Saeid, Farhood Negin, and Cemal Köse. "An efficient human action recognition framework with pose-based spatiotemporal features." Engineering Science and Technology, an International Journal 23.1 (May 2019): 196-203.

Tripathi, Vikas, et al. "Robust Action Recognition framework using Segmented Block and Distance Mean Histogram of Gradients Approach." Procedia computer science 115 (2017): 493-500.

Liu, Weiwei, et al. "Global for coarse and part for fine: A hierarchical action recognition framework." 2018 25th IEEE International Conference on Image Processing (ICIP). IEEE, 2018.

Liu, Yang, et al. "Transferable feature representation for visible-to-infrared cross-dataset human action recognition." Complexity 2018 (2018).

Wu, Shandong, Omar Oreifej, and Mubarak Shah. "Action recognition in videos acquired by a moving camera using motion decomposition of lagrangian particle trajectories." 2011 International conference on computer vision. IEEE, 2011.

* cited by examiner

FIG. 1

5 Receive at least one image of articulated objects e.g. video stream which depicts contact between articulated and non-articulated objects
↓
7: Estimate 2d pose/s e.g. using OpenPose
↓
10: Derive estimations of relative 3D joint locations
↓
20: Use object tracking or re-identification to track or recognize objects over time.
↓
30: predict absolute 3D locations of secondary objects, may use prior knowledge about object size.
↓
40: recognize interaction of e.g. joint of articulated object with object which may have known size.
↓
50: compute absolute 3D location of secondary object and/or of portion of articulated object that is interacting with secondary object.
↓
60: Using results of object tracker or re-identification operation 20, and/or by collecting all the estimates of operation 50, estimate the object's size over time.
↓
72: determine "best" measurement e.g. for each bone
↓
77: use "best" measurement, computed in operation 72, to scale relative 3D joint locations into absolute 3D joint locations.
↓
80: Compute, and provide output indication of, absolute 3D pose,
↓
90: absolute 3D pose output may be used to govern physical actions.

| No. | Equation/expression |
|---|---|
| 1 | $\begin{pmatrix} u \\ v \end{pmatrix} = \Pi \begin{pmatrix} x \\ y \\ z \end{pmatrix}$, with $\Pi = \begin{pmatrix} \frac{f}{z_0} & 0 & 0 \\ 0 & \frac{f}{z_0} & 0 \end{pmatrix}$. |
| 2 | $E = \sum_i \|K^i - \Pi((x,y,z)^\top + P^i)\|^2 = \sum_i \|K^i - \frac{f}{z}((x,y)^\top + P^i_{[xy]})\|^2$ |
| 3 | $\frac{\partial E}{\partial x} = \frac{2f}{z} \sum_i K^i_{[x]} \frac{f}{z}(P^i_{[x]} - x)$ |
| 3.1 | $x = \bar{K}_{[x]} \frac{z}{f} - \bar{P}_{[x]}$ |
| 3.2 | $y = \bar{K}_{[y]} \frac{z}{f} - \bar{P}_{[y]}$, for $\frac{\partial E}{\partial y} = 0$ |
| 4 | $\frac{\partial E}{\partial z} = \frac{f \sum_i (K^i - \bar{K})^\top (P^i_{[xy]} - \bar{P}_{[xy]})}{z^2} + \frac{f^2 \sum_i \|P^i_{[xy]} - \bar{P}_{[xy]}\|^2}{z^3}$ |
| 5 | $z = f \frac{\sum_i \|P^i_{[xy]} - \bar{P}_{[xy]}\|^2}{\sum_i (K^i - \bar{K})^\top (P^i_{[xy]} - \bar{P}_{[xy]})} \approx f \frac{\sqrt{\sum_i \|P^i_{[xy]} - \bar{P}_{[xy]}\|^2}}{\sqrt{\sum_i \|K^i - \bar{K}\|^2}}$ |
| 6 | $(K^i - \bar{K})(P^i - \bar{P}) = \|K^i - \bar{K}\| \|P^i - \bar{P}\| \cos(\theta)$ |

Fig. 2

SYSTEM, METHOD AND COMPUTER PROGRAM PRODUCT FOR DETERMINING SIZES AND/OR 3D LOCATIONS OF OBJECTS IMAGED BY A SINGLE CAMERA

FIELD OF THIS DISCLOSURE

The present invention relates generally to image processing, and more particularly to processing images generated by a single camera.

BACKGROUND FOR THIS DISCLOSURE

A method for determining the extent of an object in one direction is described e.g. in the following https link: www.pyimagesearch.com/2015/01/19/find-distance-camera-objectmarker-using-python-opencv/.

Tennis analytic methods are described e.g. in the following https link: github.com/vishaltiwari/bmvc-tennis-analytics.

Methods for fusing sensor data with visual data to estimate orientation of a ground plane are described in the following https links:
ap.isr.uc.pt/wp-content/uploads/mrl_data/archive/124.pdf;
www.ncbi.nlm.nih.gov/pmc/articles/PMC5676736/.

Other technologies useful in conjunction with certain embodiments provided herein, are described in the following http link: www.mva-org.jp/Proceedings/2013USB/papers/04-22.pdf.

Other known technologies include:

[1] Li, Sijin, and Antoni B. Chan. "3D human pose estimation from monocular images with deep convolutional neural network." *Asian Conference on Computer Vision*. Springer, Cham, 2014.

[2] Tekin, Bugra, et al. "Structured prediction of 3D human pose with deep neural networks." *arXiv preprint arXiv:* 1605.05180 (2016).

[3] Mehta, Dushyant, et al. "Vnect: Real-time 3D human pose estimation with a single rgb camera." *ACM Transactions on Graphics (TOG)* 36.4 (2017): 44.

[4] Lin, Mude, et al. "Recurrent 3D pose sequence machines." *Proceedings of the IEEE Conference on Computer Vision and Pattern Recognition*. 2017.

[5] Tome, Denis, Chris Russell, and Lourdes Agapito. "Lifting from the deep: Convolutional 3D pose estimation from a single image." *Proceedings of the IEEE Conference on Computer Vision and Pattern Recognition*. 2017.

[6] Zhou, Xingyi, et al. "Towards 3D human pose estimation in the wild: a weakly-supervised approach." *Proceedings of the IEEE International Conference on Computer Vision*. 2017.

[7] Sun, Xiao, et al. "Integral human pose regression." *Proceedings of the European Conference on Computer Vision (ECCV)*. 2018.

[8] Martinez, Julieta, et al. "A simple yet effective baseline for 3d human pose estimation." *Proceedings of the IEEE International Conference on Computer Vision*. 2017.

[9] Pavllo, Dario, et al. "3D human pose estimation in video with temporal convolutions and semi-supervised training." *arXiv preprint arXiv:* 1811.11742 (2018).

[10] Zhang. A Flexible New Technique for Camera Calibration. IEEE Transactions on Pattern Analysis and Machine Intelligence, 22(11):1330-1334, 2000.

[11] Nath, Tanmay, et al. "Using DeepLabCut for 3D markerless pose estimation across species and behaviors." *Nature protocols* (2019).

[12] Doosti, Bardia. "Hand Pose Estimation: A Survey." *arXiv preprint arXiv:* 1903.01013 (2019).

[13] Malik, Jameel, Ahmed Elhayek, and Didier Stricker. "Simultaneous hand pose and skeleton bone-lengths estimation from a single depth image." 2017 *International Conference on 3D Vision (3DV)*. IEEE, 2017.

[14] Li, Ruotong, et al. "Constraint-Based Optimized Human Skeleton Extraction from Single-Depth Camera." *Sensors* 19.11 (2019): 2604.

[15] Nägeli, Tobias, et al. "Flycon: real-time environment-independent multi-view human pose estimation with aerial vehicles." *SIGGRAPH Asia* 2018 *Technical Papers*. ACM, 2018.

[16] Arnab, Anurag, Carl Doersch, and Andrew Zisserman. "Exploiting temporal context for 3D human pose estimation in the wild." *Proceedings of the IEEE Conference on Computer Vision and Pattern Recognition*. 2019.

US20110135157A1 is a patent document in which a person's relative location is estimated by assuming an average person size.

US20080152191A1 is a patent document which uses stereo cameras to estimate a person's absolute location. EP2383696A1 is a patent document which describes a 3D pose estimator which relies on multiple cameras. Methods that explicitly resolve person size constraints, using multiple or stereo-cameras, are known also from the above references 13-15. The disclosures of all publications and patent documents mentioned in the specification, and of the publications and patent documents cited therein directly or indirectly, are hereby incorporated by reference other than subject matter disclaimers or disavowals. If the incorporated material is inconsistent with the express disclosure herein, the interpretation is that the express disclosure herein describes certain embodiments, whereas the incorporated material describes other embodiments. Definition/s within the incorporated material may be regarded as one possible definition for the term/s in question.

SUMMARY OF CERTAIN EMBODIMENTS

Certain embodiments of the present invention seek to provide circuitry typically comprising at least one hardware processor in communication with at least one memory, with instructions stored in such memory executed by the processor to provide functionalities which are described herein in detail. Any functionality described herein may be firmware-implemented, or processor-implemented, as appropriate. Certain embodiments seek to determine (a set of) typically absolute 3D locations of (respective joints of) an object (or more) imaged by only a single camera. Since only one camera is available, the actual sizes of some, many or most imaged objects e.g. persons, are generally not known, since the imaged size is a variable not directly related to the actual size variable and is instead related to actual size via another variable namely the distance of the object from the camera or depth. However, the actual size of certain objects may be known e.g., just by way of example, a floor on which a person is standing or a ball which a person handles (catches, holds or otherwise interacts with), or a manufactured object whose size is known such as a recognizable vehicle or toy or commodity or appliance or tool. Or, the actual location of certain objects may be known e.g. the location of a given floor or other ground plane; it is appreciated that any uses of an object's known size described herein e.g. to derive sizes and/or locations of other objects, may if desired be replaced, mutatis mutandis, by uses of an object's known location, or vice versa.

Certain embodiments seek to determine a (typically absolute) 3D location of an object x by identifying an interaction between that object and another object y whose absolute 3D location is known. If this interaction occurs at time t, then at time t, the 3D location of object x is the known 3D location of object y. For example, if a person is known to be standing on (interacting with) the floor at time t, and the floor's typically absolute location and/or size is known, the size, and/or absolute location at time t, of the person may be determined.

Typically a person's absolute location is provided as a "pose" e.g. the 3D absolute location of each (or some) of the person's joints.

The following terms may be construed either in accordance with any definition thereof appearing in the prior art literature or in accordance with the specification, or to include in their respective scopes, the following:

Articulated Objects Vs. Secondary (Aka Non-Articulated) Objects:

This may be e.g. a person and ball respectively. The secondary object is used to localize or size-estimate the first object.

Absolute (aka true) vs. relative 3D locations:

Relative 3D locations, or 3D locations with unknown scale factor, are typically unitless and typically comprise coordinates with unknown scaling; typically, these coordinates are relative to an average person size. Relative 3d locations are indicative of direction; e.g. may indicate that a person is pointing towards a camera rather than away; but are not indicative of, say, how distant the person's hand is from the camera. Relative 3D joint locations are helpful for action recognition, because movement is roughly invariant over person size. In contrast, absolute 3d locations yield information on what a person is doing, as well as his location.

Relative coordinates of a point set P, with ground-truth coordinates Q typically means that for every i, j there is an angle between $p\_i\ p\_j$ and $q\_i\ q\_j$ that equals zero. Thus, the predicted angles are all correct.

A method that predicts absolute coordinates P ensures that the proper scaling is found, therefore $p\_i=q\_i$.

Absolute 3D locations are real or physical 3D locations typically provided relative to a real-world coordinate system, e.g. in meters. The absolute locations of an articulated object typically comprise a set of 3D vectors (x, y, z). This set typically represents the 3D location of all or at least some of the joints of the articulated object.

2d locations: within a frame; typically indicated in pixels.

Pose: This includes the pose e.g. of an articulated object e.g. a person. This typically includes the absolute 3d locations, of all articulated objects, moving parts, or of all of a person's (a human body's) components e.g. joints and/or limb portions. For example, the pose simply is 3d coordinates, e.g. in meters, for each joint in the body e.g. xyz coordinates, e.g. in meters, of a tracked person's neck, and of her or his right and left ankle, knee, wrist and elbow joints.

Predict=determine=compute=estimate: These are used generally interchangeably herein.

Limbs: e.g. an arm or a leg, each of which have upper and lower portions, as opposed to joints.

Joints: between typically rigid members. e.g. elbows and knees, which are positioned between upper and lower portions of an arm or leg respectively.

Person size: this may include a collection of plural lengths along the kinematic chain representing the person.

Interaction: when two objects are at a single absolute location e.g. because one object is touching or handling the other (two people dancing with one another, a person handling a ball of a known size, a person's feet standing on the ground or floor, for example).

Kinematic length: distance or length between two joints that are physically connected. "action recognition framework": software operative to detect the moment or point in time at which a first object, e.g. person, is touching a second object e.g. non-articulated object, e.g. with known size. The input to the software typically comprises a sequence of images and the output typically comprises locations in time (e.g. frame number) and/or location (typically in pixels) within the frame at which the person (say) has touched the ball (say).

Kinematic pairs: A tree may include plural "kinematic pairs". Each such pair typically comprises a computational model of a connection, or joint (e.g. elbow), between two connected links (e.g. the upper and lower arm connected at the elbow). The computational model provided by a "kinematic pair" reflects the nature of the joint between a pair of connected links e.g. whether the joint is hinged, sliding, etc.

It is appreciated that any reference herein to, or recitation of, an operation being performed is, e.g. if the operation is performed at least partly in software, intended to include both an embodiment where the operation is performed in its entirety by a server A, and also to include any type of "outsourcing" or "cloud" embodiments in which the operation, or portions thereof, is or are performed by a remote processor P (or several such), which may be deployed off-shore or "on a cloud", and an output of the operation is then communicated to, e.g. over a suitable computer network, and used by server A. Analogously, the remote processor P may not, itself, perform all of the operations, and, instead, the remote processor P itself may receive output/s of portion/s of the operation from yet another processor/s P', may be deployed off-shore relative to P, or "on a cloud", and so forth.

There is thus provided, in accordance with at least one embodiment of the present invention, The present invention typically includes at least the following embodiments:

Embodiment 1. A system (or method or computer program product) for estimating an absolute 3D location of at least one object x imaged by a single camera, the system including processing circuitry configured for identifying an interaction, at time t, of object x with an object y typically imaged with the object x typically by the single camera, typically including logic for determining object y's absolute 3D location at time t, and/or providing an output indication of object x's absolute location at time t, typically derived from the 3D location, as known, at time t, of object y.

Embodiment 2. A system according to any of the preceding embodiments wherein the object x comprises a first joint interconnected via a limb of fixed length to a second joint and wherein the system determines the fixed length and then determines the second joint's absolute 3D location at time t to be a location L whose distance from object x's absolute location at time t, is the fixed length.

Embodiment 3. A method for providing an output indication of absolute 3D locations of objects imaged by a single camera, the method including using a hardware processor for performing, at least once, all or any subset of the following operations:

a. providing relative 3D joint locations for an object x having joints J whose absolute locations are of interest; and/or b. providing absolute 3D locations of at least one object y, which is imaged by the single camera and whose size is known; and/or c. re-identifying objects x, y over time; and/or d. recognizing interaction of object x as re-identified in operation c, with the object y of known size as re-identified in operation c; and/or e. for each interaction recognized in operation d,
finding absolute 3D location L of object y with known size, at time T at which interaction occurred; and/or
setting absolute 3D location of joint J to be L; and/or
using relative 3D locations as provided in operation a of at least one joint k other than J relative to 3D location of joint J, to compute absolute 3D locations of joint k, given the absolute location L of J as found; and/or
determining distances between absolute 3D locations of various joints k, to yield an object size parameter comprising an estimated length of a limb portion extending between joints j and k; and/or f. computing a best-estimate from the object sizes estimated in operation e, for each tracked limb portion; and/or g. using the best-estimate to scale relative 3D joint locations into absolute 3D joint locations; and/or h. generating an output indication of the absolute 3D joint locations.

Embodiment 4. A method according to any of the preceding embodiments wherein the object y is a stationary object having a permanent absolute 3D location which is stored in memory.

Embodiment 5. A method according to any of the preceding embodiments wherein the object y comprises a ball and wherein data is pre-stored regarding the ball's known conventional size.

Embodiment 6. A method according to any of the preceding embodiments wherein in operation c, the re-identifying objects comprises tracking the objects.

Embodiment 7. A method according to any of the preceding embodiments wherein in operation f, the computing of a best-estimate includes removing outliers which differ from a cluster of estimates to a greater extent, relative to the extent to which the estimates in the cluster differ among themselves.

Embodiment 8. A method according to any of the preceding embodiments wherein the method is performed in near-real time.

Embodiment 9. A method according to any of the preceding embodiments wherein in operation h, the output indication serves as an input to a processor which identifies interesting moments in the single camera's output and alerts end-users of the interesting moments.

Embodiment 10. A method according to any of the preceding embodiments wherein in operation h, the output indication serves as an input to a processor which controls insertions of virtual advertisements.

Embodiment 11. A method according to any of the preceding embodiments wherein the object y comprises an object O whose absolute 3d joint locations are known from operation h by virtue of having previously derived absolute 3D locations of object O's joints by performing the operations a-h.

Embodiment 12. A method according to any of the preceding embodiments wherein the output indication may be sensed by a human user.

Embodiment 13. A system according to any of the preceding embodiments wherein the determining object y's absolute 3D location comprises retrieving object y's absolute 3d location from memory, because object y's absolute 3D location is known to the system.

each joint may comprise a joint from among the following group: shoulder, elbow, wrist, knee, ankle.

Embodiment 14. A system according to any of the preceding embodiments wherein the processing circuitry is also configured for: generating plural estimates of object x's size for plural interactions respectively; and/or finding a best estimate from among the estimates, over time, and/or using the best estimate to estimate the absolute 3D location, thereby to handle situations in which object-joint distance is not exactly 0.

Embodiment 15. A system according to any of the preceding embodiments wherein the object x's absolute location at time t is estimated as being equal to the 3D location, as known, at time t, of object y.

Embodiment 16. A system according to any of the preceding embodiments wherein the object y's size is known and wherein the logic uses knowledge about the object y's size to derive the object x's absolute location at time t.

Embodiment 17. A computer program product, comprising a non-transitory tangible computer readable medium having computer readable program code embodied therein, the computer readable program code adapted to be executed to implement a method, the method comprising any method herein.

Embodiment 18. A system according to any of the preceding embodiments wherein at least one fixed size, known to remain fixed between frames, which characterizes object x is used for converting object x's relative 3D joint locations to absolute 3D joint locations for object x.

Embodiment 19. A system according to any of the preceding embodiments wherein the fixed size comprises an actual distance between 2 connected joints belonging to object x.

Embodiment 20. A system according to any of the preceding embodiments wherein the converting is performed for at least one frame in which object x is not interacting with object y.

Also provided, excluding signals, is a computer program comprising computer program code means for performing any of the methods shown and described herein when the program is run on at least one computer; and a computer program product, comprising a typically non-transitory computer-usable or -readable medium e.g. non-transitory computer-usable or -readable storage medium, typically tangible, having a computer readable program code embodied therein, the computer readable program code adapted to be executed to implement any or all of the methods shown and described herein. The operations in accordance with the teachings herein may be performed by at least one computer specially constructed for the desired purposes or general purpose computer specially configured for the desired purpose by at least one computer program stored in a typically non-transitory computer readable storage medium. The term "non-transitory" is used herein to exclude transitory, propagating signals or waves, but to otherwise include any volatile or non-volatile computer memory technology suitable to the application.

Any suitable processor/s, display and input means may be used to process, display e.g. on a computer screen or other computer output device, store, and accept information such as information used by or generated by any of the methods and apparatus shown and described herein; the above processor/s, display and input means including computer programs, in accordance with all or any subset of the embodiments of the present invention. Any or all functionalities of the invention shown and described herein, such as but not limited to operations within flowcharts, may be performed by any one or more of: at least one conventional personal computer processor, workstation or other programmable device or computer or electronic computing device or processor, either general-purpose or specifically constructed, used for processing; a computer display screen and/or printer and/or speaker for displaying; machine-readable memory such as flash drives, optical disks, CDROMs, DVDs, BluRays, magnetic-optical discs or other discs; RAMs, ROMs, EPROMs, EEPROMs, magnetic or optical or other cards, for storing, and keyboard or mouse for accepting. Modules illustrated and described herein may include any one or combination or plurality of: a server, a data processor, a memory/computer storage, a communication interface (wireless (e.g. BLE) or wired (e.g. USB)), a computer program stored in memory/computer storage.

The term "process" as used above is intended to include any type of computation or manipulation or transformation of data represented as physical, e.g. electronic, phenomena which may occur or reside e.g. within registers and/or memories of at least one computer or processor. Use of nouns in singular form is not intended to be limiting; thus the term processor is intended to include a plurality of processing units which may be distributed or remote, the term server is intended to include plural typically interconnected modules running on plural respective servers, and so forth.

The above devices may communicate via any conventional wired or wireless digital communication means, e.g. via a wired or cellular telephone network or a computer network such as the Internet.

The apparatus of the present invention may include, according to certain embodiments of the invention, machine readable memory containing or otherwise storing a program of instructions which, when executed by the machine, implements all or any subset of the apparatus, methods, features and functionalities of the invention shown and described herein. Alternatively or in addition, the apparatus of the present invention may include, according to certain embodiments of the invention, a program as above which may be written in any conventional programming language, and optionally a machine for executing the program such as but not limited to a general purpose computer which may optionally be configured or activated in accordance with the teachings of the present invention. Any of the teachings incorporated herein may, wherever suitable, operate on signals representative of physical objects or substances.

The embodiments referred to above, and other embodiments, are described in detail in the next section.

Any trademark occurring in the text or drawings is the property of its owner and occurs herein merely to explain or illustrate one example of how an embodiment of the invention may be implemented.

Unless stated otherwise, terms such as, "processing", "computing", "estimating", "selecting", "ranking", "grading", "calculating", "determining", "generating", "reassessing", "classifying", "generating", "producing", "stereo-matching", "registering", "detecting", "associating", "superimposing", "obtaining", "providing", "accessing", "setting" or the like, refer to the action and/or processes of at least one computer/s or computing system/s, or processor/s or similar electronic computing device/s or circuitry, that manipulate and/or transform data which may be represented as physical, such as electronic, quantities e.g. within the computing system's registers and/or memories, and/or may be provided on-the-fly, into other data which may be similarly represented as physical quantities within the computing system's memories, registers or other such information storage, transmission or display devices or may be provided to external factors e.g. via a suitable data network. The term "computer" should be broadly construed to cover any kind of electronic device with data processing capabilities, including, by way of non-limiting example, personal computers, servers, embedded cores, computing systems, communication devices, processors (e.g. digital signal processor (DSP), microcontrollers, field programmable gate arrays (FPGAs), application specific integrated circuits (ASICs), etc.) and other electronic computing devices. Any reference to a computer, controller or processor, is intended to include one or more hardware devices e.g. chips, which may be co-located or remote from one another. Any controller or processor may for example comprise at least one CPU, DSP, FPGA or ASIC, suitably configured in accordance with the logic and functionalities described herein.

Any feature or logic or functionality described herein may be implemented by processor/s or controller/s configured as per the described feature or logic or functionality, even if the processor/s or controller/s are not specifically illustrated for simplicity. The controller or processor may be implemented in hardware, e.g., using one or more Application-Specific Integrated Circuits (ASICs) or Field-Programmable Gate Arrays (FPGAs), or may comprise a microprocessor that runs suitable software, or a combination of hardware and software elements.

The present invention may be described, merely for clarity, in terms of terminology specific to, or references to, particular programming languages, operating systems, browsers, system versions, individual products, protocols and the like. It will be appreciated that this terminology or such reference/s is intended to convey general principles of operation clearly and briefly, by way of example, and is not intended to limit the scope of the invention solely to a particular programming language, operating system, browser, system version, or individual product or protocol. Nonetheless, the disclosure of the standard or other professional literature defining the programming language, operating system, browser, system version, or individual product or protocol in question, is incorporated by reference herein in its entirety.

Elements separately listed herein need not be distinct components and alternatively may be the same structure. A statement that an element or feature may exist is intended to include (a) embodiments in which the element or feature exists; (b) embodiments in which the element or feature does not exist; and (c) embodiments in which the element or feature exist selectably e.g. a user may configure or select whether the element or feature does or does not exist.

Any suitable input device, such as but not limited to a sensor, may be used to generate or otherwise provide information received by the apparatus and methods shown and described herein. Any suitable output device or display may be used to display or output information generated by the apparatus and methods shown and described herein. Any suitable processor/s may be employed to compute or generate information as described herein and/or to perform functionalities described herein and/or to implement any engine, interface or other system illustrated or described herein. Any suitable computerized data storage e.g. computer memory, may be used to store information received by or generated by the systems shown and described herein. Functionalities shown and described herein may be divided between a server computer and a plurality of client computers. These or any other computerized components shown and described herein may communicate between themselves via a suitable computer network.

The system shown and described herein may include user interface/s e.g. as described herein which may for example include all or any subset of: an interactive voice response interface, automated response tool, speech-to-text transcription system, automated digital or electronic interface having interactive visual components, web portal, visual interface loaded as web page/s or screen/s from server/s via communication network/s to a web browser or other application downloaded onto a user's device, automated speech-to-text conversion tool, including a front-end interface portion thereof and back-end logic interacting therewith. Thus the term user interface or "UI" as used herein includes also the underlying logic which controls the data presented to the user e.g. by the system display and receives and processes and/or provides to other modules herein, data entered by a user e.g. using her or his workstation/device.

BRIEF DESCRIPTION OF THE DRAWINGS

Certain embodiments of the present invention are illustrated in the following drawings; in the block diagrams, arrows between modules may be implemented as APIs and any suitable technology may be used for interconnecting functional components or modules illustrated herein in a suitable sequence or order e.g. via a suitable API/Interface. For example, state of the art tools may be employed, such as but not limited to Apache Thrift and Avro which provide remote call support. Or, a regular communication protocol may be employed, such as but not limited to HTTP or MQTT, and may be combined with a standard data format, such as but not limited to JSON or XML.

Methods and systems included in the scope of the present invention may include any subset or all of the functional blocks shown in the specifically illustrated implementations by way of example, in any suitable order e.g. as shown. Flows may include all or any subset of the illustrated operations, suitably ordered e.g. as shown. Tables herein may include all or any subset of the fields and/or records and/or cells and/or rows and/or columns described.

Example embodiments are illustrated in the various drawings. Specifically:

FIG. 1 is a simplified flowchart illustration of a process provided in accordance with embodiments herein.

FIG. 2 is a table useful for understanding embodiments herein.

Figure 3:
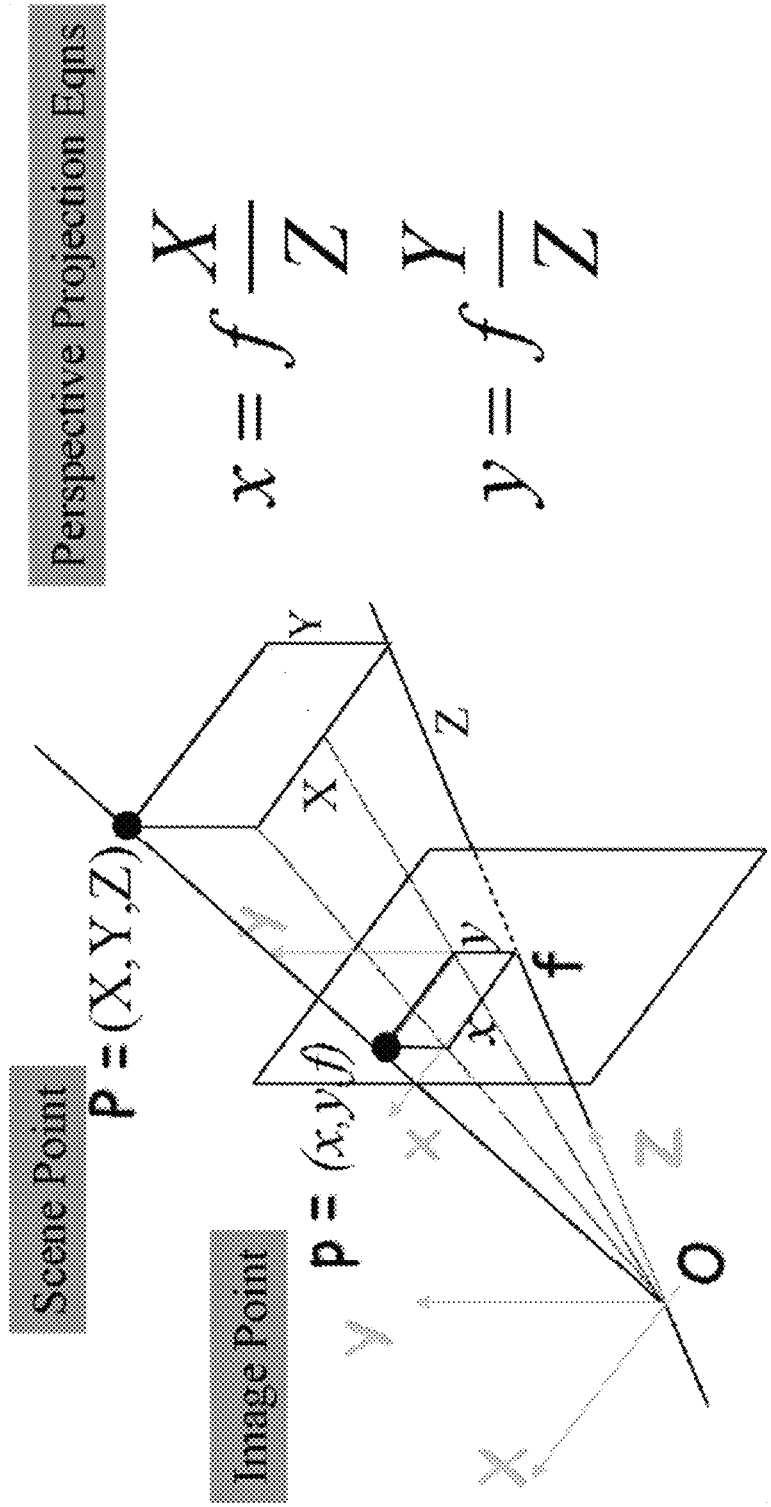
Figure 4:
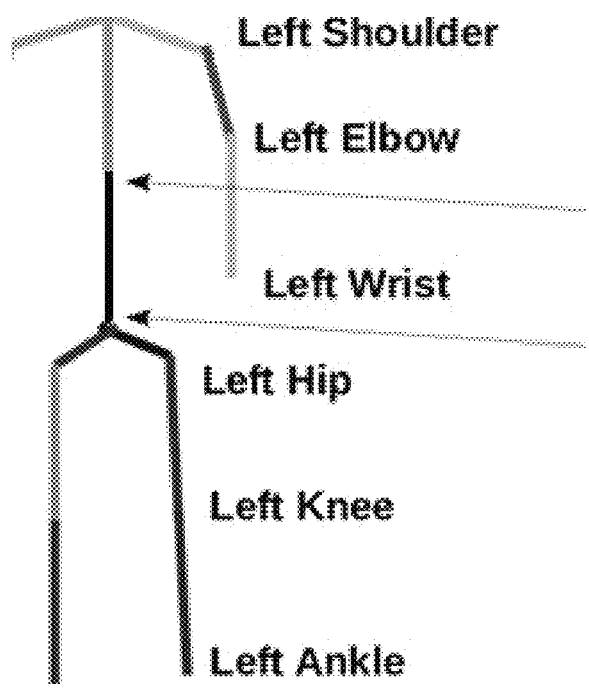

FIGS. 3 and 4 are pictorial illustrations useful in understanding certain embodiments.

Computational, functional or logical components described and illustrated herein can be implemented in various forms, for example, as hardware circuits such as but not limited to custom VLSI circuits or gate arrays or programmable hardware devices such as but not limited to FPGAs, or as software program code stored on at least one tangible or intangible computer readable medium and executable by at least one processor, or any suitable combination thereof. A specific functional component may be formed by one particular sequence of software code, or by a plurality of such, which collectively act or behave or act as described herein with reference to the functional component in question. For example, the component may be distributed over several code sequences such as but not limited to objects, procedures, functions, routines and programs and may originate from several computer files which typically operate synergistically.

Each functionality or method herein may be implemented in software (e.g. for execution on suitable processing hardware such as a microprocessor or digital signal processor), firmware, hardware (using any conventional hardware technology such as Integrated Circuit technology) or any combination thereof.

Functionality or operations stipulated as being software-implemented may alternatively be wholly or fully implemented by an equivalent hardware or firmware module and vice-versa. Firmware implementing functionality described herein, if provided, may be held in any suitable memory device and a suitable processing unit (aka processor) may be configured for executing firmware code. Alternatively, certain embodiments described herein may be implemented partly or exclusively in hardware in which case all or any subset of the variables, parameters, and computations described herein may be in hardware.

Any module or functionality described herein may comprise a suitably configured hardware component or circuitry. Alternatively or in addition, modules or functionality described herein may be performed by a general purpose computer or more generally by a suitable microprocessor, configured in accordance with methods shown and described herein, or any suitable subset, in any suitable order, of the operations included in such methods, or in accordance with methods known in the art.

Any logical functionality described herein may be implemented as a real time application, if and as appropriate, and which may employ any suitable architectural option, such as but not limited to FPGA, ASIC or DSP, or any suitable combination thereof.

Any hardware component mentioned herein may in fact include either one or more hardware devices e.g. chips, which may be co-located or remote from one another.

Any method described herein is intended to include within the scope of the embodiments of the present invention also any software or computer program performing all or any subset of the method's operations, including a mobile application, platform or operating system e.g. as stored in a medium, as well as combining the computer program with a hardware device to perform all or any subset of the operations of the method.

Data can be stored on one or more tangible or intangible computer readable media stored at one or more different locations, different network nodes or different storage devices at a single node or location.

It is appreciated that any computer data storage technology, including any type of storage or memory and any type of computer components and recording media that retain digital data used for computing for an interval of time, and any type of information retention technology, may be used to store the various data provided and employed herein. Suitable computer data storage or information retention apparatus may include apparatus which is primary, secondary, tertiary or offline; which is of any type or level or amount or category of volatility, differentiation, mutability, accessibility, addressability, capacity, performance and energy use; and which is based on any suitable technologies such as semiconductor, magnetic, optical, paper and others.

DETAILED DESCRIPTION OF CERTAIN EMBODIMENTS

Each element e.g operation described herein may have all characteristics described or illustrated herein or according to other embodiments, may have any subset of the characteristics described herein.

The terms processor or controller or module or logic as used herein are intended to include hardware such as computer microprocessors or hardware processors, which typically have digital memory and processing capacity, such as those available from, say Intel and Advanced Micro Devices (AMD). any operation or functionality or computation or logic described herein may be implemented entirely or in any part on any suitable circuitry including any such computer microprocessor/s as well as in firmware or in hardware or any combination thereof.

It is appreciated that elements illustrated in more than one drawings, and/or elements in the written description may still be combined into a single embodiment, except if otherwise specifically clarified herewithin. It is appreciated that any features, properties, logic, modules, blocks, operations or functionalities described herein which are, for clarity, described in the context of separate embodiments, may also be provided in combination in a single embodiment except where the specification or general knowledge specifically indicates that certain teachings are mutually contradictory and cannot be combined. any of the systems shown and described herein may be used to implement or may be combined with, any of the operations or methods shown and described herein.

FIG. 1 describes a process including operations for determining absolute 3d locations of objects of interest. The process of FIG. 1 includes all or any subset of the following operations, suitably ordered e.g. as follows; all operations and methods described herein may be performed for example by a suitable hardware processor.

Operation 5

Receive at least one image of articulated objects (e.g. a single image which depicts contact between articulated and non-articulated objects). Typically the input comprises a video stream which typically depicts contact between articulated and non-articulated objects, typically without further input.

Each articulated object typically includes plural rigid object-portions or links, e.g. human limbs, which are interconnected by joints, where each joint interconnecting object portions a, b allows rotational and/or translational relative motion between a and b, the relative motion of each pair of object-portions, if translational, typically having 1 or 2 or 3 degrees of freedom along 1 or 2 or 3 perpendicular axes respectively.

Operation 7:

Operation 7 may be performed, in which the 2d pose is estimated, using a suitable algorithm such as OpenPose for example, which is described at the following https link: github.com/CMU-Perceptual-Computing-Lab/openpose. OpenPose describes a 2D pose estimator.

Operation 10

Derive estimations of relative 3D joint locations from the (at least one) image. For example, if the image represents a scene including plural persons, relative 3D joint locations may be estimated for each of the plural persons in the scene. Here, method A will be used.

Method A computes relative 3D locations, which are ambiguous in scale and position; (e.g. a human body with unknown distances between the body's joints (along limb portions of unknown lengths), hence cannot differentiate an image of a large person from an image of a smaller person who is closer to the camera.

The output of method A is relative to 3D joint locations, with ambiguous person size.

Method A typically comprises a 3D pose estimation algorithm using no prior knowledge about person size e.g. the 3D pose estimator described at the following https link: arxiv.org/pdf/1705.03098.pdf, which uses the 2d post estimated in operation 7, as an input.

Operation 20

Use object tracking or re-identification to track or recognize objects over time. For example, object/s e.g. all joints in a scene, and/or at least one secondary or non-articulated objects such as a ball, may be fully tracked over time. And/or, any other reconstructed absolute 3D locations may be tracked over time, e.g. using simultaneous localization and mapping (SLAM), which is a known technology for constructing or updating a map of an unknown environment while simultaneously keeping track of an agent's absolute location within that environment, using any suitable method such as particle filter, extended Kalman filter, Covariance intersection, and GraphSLAM Any suitable method may be employed to initially recognize each articulated object, such as but not limited to pose estimation algorithms such as openpose (e.g. described at the following https link: github.com/cmu-perceptual-computing-lab/openpose).

Any suitable method may be used for tracking e.g. any suitable video tracking technique such as but not limited to kernel-based tracking or contour tracking.

The tracking technology described in the following publication found at the following https link: arxiv.org/pdf/1606.09549.pdf.

may also be used.

If bounding box tracking functionality (aka bounding box tracker) is used, the tracked bounding box is typically matched against a previously detected bounding box. Typically, a track is matched to a (or each) current detection, including assigning each detection to a track or assigning that track's ID to that detection.

A bounding box may be computed for articulated objects, by receiving a set of 2d pixel locations of an object determining the object's minimal and maximal x, y coordinates from among the 2d locations in the set and using these minimal and maximal coordinates as inputs to the bounding box tracker. The tracker may, for example, use the bounding boxes of frame t and the image at t+1 as inputs to a function which predicts bounding boxes om frame t+1.

Operation 30

Operation 30 typically employs method b aka requirement ii, which accurately predicts absolute 3D locations of the secondary objects, meaning these coordinates are not ambiguous in scale and position (e.g. a ball whose actual size in cm is known).

Method B typically performs accurate 3D object detection, and may use prior knowledge about object size.

For example, a CNN (Convolutional Neural Network) may be configured for receiving an image and predicting actions and their localization. For example a method for detecting shots of balls in soccer broadcasting videos is described in S. Jackman, "Football Shot Detection using Convolutional Neural Networks", available online at the following https link: www.diva-portal.org/smash/get/diva2: 1323791/FULLTEXT01.pdf, Aka [Jackman2019].

Method B may be used to predict absolute 3D locations of secondary e.g. non-articulated objects. Method B is typically operative to predict absolute 3D locations of secondary objects (e.g. a ball), yielding 3D coordinates for the secondary object, whose scale and position are unambiguous.

There exist methods which accurately predict absolute 3D locations for objects; such methods are described e.g. in the following https links:

www.pyimagesearch.com/2015/01/19/find-distance-camera-objectmarker-using-python-opencv/; and/or
github.com/vishaltiwari/bmvc-tennis-analytics.

For example, the absolute 3D location for 2 example objects (ground plane, soccer ball) may be computed as follows:

i. An AR (augmented reality) toolkit may be used to estimate absolute 3d location of ground-plane, e.g. as described in the following https link: blog.markdaws.net/arkit-by-example-part-2-plane-detection-visualization-10f05876d53.

ii. Absolute 3D location of a soccer ball may be estimated based on prior knowledge of conventional/regular ball sizes. Methods which compare imaged size to real-life size and derive absolute 3D location are described e.g. in the following https links:
www.pyimagesearch.com/2015/01/19/find-distance-camera-objectmarker-using-python-opencv/; and/or
github.com/vishaltiwari/bmvc-tennis-analytics; and/or
www.mva-org.j p/Proceedings/2013USB/papers/04-22.pdf.

Operation 40

Use of an "action recognition framework" to recognize an interaction of a joint of an articulated object, e.g. person, with an object of known size.

The output of operation 40 typically comprises all or any subset of:

a. the number and/or time-stamp of a frame, in a video sequence, in which a person's hand (say) touches a secondary object of interest e.g. a ball; and/or b. x, y location (e.g. pixel) within this frame, at which the hand and ball are located.

c. identification of the body limb portion and secondary object which interacted in this frame. For example, in the above example, body limb portion=hand; secondary object=ball.

The object of known size may for example be:

i. Ground-plane on which a person's foot is placed.

The size of the ground-plane may be known (or determined either offline or in near real time), and, typically, the absolute 3D locations of the boundaries of the ground-plane, using any suitable method. For example, the ground plane's distance from a camera imaging the ground plane, and the ground-plane's orientation relative to the camera, may be estimated accurately, e.g. by an AR toolkit, in at least one frame, typically for each and every frame.

The ray from the camera which intersects a known 2D pixel location of a joint at the moment of that joint's interaction with an object of known 3D absolute position, e.g. as determined in Operation 40, will intersect the ground plane at an absolute 3D location L, which may serve as an estimate of the absolute foot location.

Example: the 2D location may be a left foot's 2D pixel location at the time when the foot comes into contact with a ball that the foot is about to kick. Or, the 2D location may be the left foot's 2D location at the moment a person comes into contact with (e.g. lands on, perhaps following a jump) a known ground plane; this may be defined using an equation defining the relationship between absolute coordinates x, y, and z of (say) a ground plane. For example, in the Hessian form, $x*a+y*b+z*c=d$ defines the ground plane with (a, b, c) as a normal vector and d is the distance from the origin to the plane. a, b, c and d are then found e.g. using a conventional AR toolkit.

Thus, the ground plane may be described analytically e.g. as an equation, which holds for any point (x, y, z) which lies on the ground plane. The ground floor may be assumed to be a plane, and small deviations from the plane due to a surface of grass or coarse asphalt e.g., may be ignored.

It is appreciated that L is known, because if the ground plane is known, the 3D ray from the focus that intersects the 2D pixel location can be found with known intrinsics e.g. as described in FIG. 3, which is based on Slide 10 of the presentation at the following http link: www.cse.psu.edu/~rtc12/CSE486/lecture12.pdf, which gives formulas parameterized in depth Z.

An example illustrating determination of an absolute 3D location of a joint touching a plane with known parameters is now described in detail; it is appreciated that the plane may alternatively be parameterized in different ways, whereas the example assumes the plan is parameterized using the Hessian normal form:

$$n\_x*X+n\_y*Y+n\_z*Z=-p \text{ (equation 6 from the following http link: mathworld.wolfram.com/HessianNormalForm.html)} \quad (I)$$

The parameters n_x, n_y, n_z and p may be determined by operation 30 herein. The above equation (I) is true if (X, Y, Z) lie on the plane.

The relationship between absolute 3D location (X, Y, Z) of a joint and its projected 2D pixel location (u, v) is given by the following system of equations, aka "camera projection equation/s"

$$x'=X/Z \quad (II)$$

$$y'=Y/Z \quad (III)$$

$$u=f\_x*x'+c\_x \quad (IV)$$

$$v=f\_y*y'+c\_y \quad (V)$$

(see equations in the following https link: docs.opencv.org/2.4/modules/calib3d/doc/camera_calibration_and_3d_reconstruction.html (Note x=X, y=Y and z=Z as world coordinates are typically not relevant to the present context).

As the absolute 3D joint location is touching or intersecting the plane, assume the absolute 3D location lies on the plane. Therefore the equations I-V can be solved for the 3D absolute location (X, Y, Z).

Solving IV and V for x' and y':

$$u=f\_x*x'+c\_x \Leftrightarrow x'=(u-c\_x)/f\_x$$

$$v=fy*y'+c\_y \Leftrightarrow y'=(v-c\_y)/f\_y$$

and inserting values of x' and y' into II and III:

$$(u-c\_x)/f\_x=X/Z \Leftrightarrow (u-c\_x)/f\_x*Z=X \quad (VI)$$

$$(v-c\_y)/f\_y=Y/Z \Leftrightarrow (v-c\_y)/f\_y*Z=Y \quad (VII)$$

And inserting these into I, results in a solution for Z $$n\_x*(u-c\_x)/f\_x*Z+n\_y*(v-c\_y)/f\_y*Z+n\_z*Z=-p$$

$$\Leftrightarrow (n\_x*(u-c\_x)/f\_x+n\_y*(v-c\_y)/f\_y+n\_z)*Z=-p$$

$$\Leftrightarrow Z=-p/(n\_x*(u-c\_x)/f\_x+n\_y*(v-c\_y)/f\_y+n\_z)$$

The value of X and Y may be computed by equations VI and VII:

$$X=(u-c\_x)/f\_x*Z$$

$$Y=(v-c\_y)/f\_y*Z$$

ii. A ball (e.g. a person who is holding a ball in his hands), in which case "interaction recognition" may be based on 2D pose and 2D ball locations.

iii. Another articulated object (e.g. person B dancing with person A) whose kinematic lengths are already known. It is appreciated that (kinematic lengths for a given person imaged in a frame, may be known (available to the system).

For example, consider a video sequence representing two persons, A and B, playing basketball. A handles or interacts with the ball. This first interaction allows A's absolute location to be determined. Then, A bumps into B. This subsequent interaction allows the absolute location of B to be estimated immediately e.g. in real- or near-real time.

Here, Method C is used. Method C detects interactions between objects of interest and secondary objects.

Operation 40 typically employs Method C aka requirement iii aka "action recognition framework", which detects interactions of the the object with secondary objects (e.g. the person holding the ball in his hands).

Using Method C, any non-articulated object with known size can be localized by detecting image 2D positions and their mapping to the objects coordinate system e.g. as described in Z. Zhang, "A Flexible New Technique for Camera Calibration", IEEE Transactions on Pattern Analysis and Machine Intelligence, 22(11):1330-1334, 2000, available online at the following https link: www.microsoft.com/en-us/research/wp-content/uploads/2016/02/tr98-71.pdf, aka [Zhang2000].

Alternatively, any other camera calibration technique, not necessarily Zhang 2000, which computes an object's (typically absolute) 3D location based on the object's known size, may be used, such as any such technique used in augmented reality applications for fixed objects.

Alternatively, Method C may comprise any of the embodiments described in italics herein:

Provided is a system for tracking one or multiple users interaction with the environment and sports tools like balls, tennis racket, etc.

The system may use the sensors of a mobile phone (e.g., camera, IMU, audio) and auxiliary devices (e.g. IMU on a smart watch) as well as inter device communication (e.g. UWB for precise localization) to capture the environment, relevant objects and the spatial configuration and measure activities and interactions, analyze the performance during the exercise and provide feedback to the user in real-time during and after execution of the exercise. Feedback can be acoustic or visual and can be related to instructions regarding the setup of the system, regarding execution of the exercise, feedback regarding user performance.

The system may include all or any subset of:
  In addition to components of System for interactive physical exercises using mobile phones–Shot on Goal
  Computational Resource Management: Methods to estimate at what frequency and time certain costly operations like ball and pose detection have to be run to achieve the best results in action detection and classification as well as methods to determine volume of interests (region+scale) the image where to focus on with computations.
  Uncertainty estimation: Methods to estimate whether a decision by one or multiple components is confident or if there is a lot of underlying uncertainty. This improves handling of difficult cases that are hard to detect and are affected by noise, e.g. slight touches, ground hits with nearby foot. Estimations with an increased uncertainty could also trigger other more costly methods of determining the action if needed.
  Human pose dynamics model: Methods that enable the system to understand the probability of an event detection/classification given a certain pose/movement, e.g. a standing foot cannot be used for kicking the ball. So a person standing on his right foot will most likely be kicking the ball with the left foot.

Exemplary Application

Ball Handling

In this application the disclosed technology is used to implement an exercise in which the user is judged on his skills with handling the ball.

In an optional step, the user is scanning the environment with the camera of the phone to establish a virtual world coordinate system (see Augmented Reality) and/or the ground plane.

As soon as a ball enters the field of view of the smart phone camera, it is recognized and tracked by the system (see Image Analysis and Multi-Target Tracking). If multiple balls are detected in the scene the system can determine the relevant one (see Determination of relevant objects).

The system detects events, states (e.g. the ball bounced, was kicked, is balanced) and classifies events and states (e.g. the ball bounced on the floor, was kicked with the left foot, was balanced on the shoulders). In addition, the system can determine whether the ball is in the air or on the ground.

The exercise could be comprised of freestyle scoring of certain event/state/class combinations or based on achieving a certain sequence of combinations (e.g. do 10 kicks, alternating between left and right knee).

Exercises can transition automatically without need for the user to interact manually with the device. Voice instructions can be used to alter the exercises and audio feedback can instruct the user what to do next as well as signal successful and unsuccessful actions.

Each ball interaction can be analyzed according to various performance metrics relevant for the exercise, such as incoming velocity, outgoing velocity, body part used, bounce on environment/ground, complexity of sequences Other application examples:
  Determine which foot was used to shoot a goal
  Ball control to determine skillful handling of the ball Technical Method Problem: determine detailed information of actions, activities and interactions of/between persons, objects (e.g. ball) and environment
  Scene contains one or more persons with each other, one or more real physical objects (e.g. a ball) and/or one or more virtual objects placed in the virtual representation of the world
  Actions, Activities and Interactions can be described as events and states varying in length
  For each action/activity/interaction determine e.g. which body part interacted with the object when, where and for how long: (classification)
    Potential event classes: with which body part the interaction (e.g. bounce of ball on person) occurred (e.g. left foot, right foot, head, left shoulder, left hand, . . . )
    Interaction state classes: e.g. with which body part the state (e.g. holding, balancing) occurred (e.g. left foot, right foot, head, left shoulder, left hand, . . . );
    Action/Activity state classes: e.g. whether the ball is in air, on ground, static, moving, undefined, etc.
  Enriched Events:
    Determine location of where interaction took place (e.g. part of the foot, where on the object)
    Determine effect of the interaction: e.g. object delta V (i.e. change of motion and motion direction), person balance Determine energy transfer between interacting objects and environment (e.g. delta V, waste of kinetic energy) to determine efficiency useful energy vs wasted energy, e.g. efficiency of a kick, how much energy from the leg was transferred to the ball.

Optional: additionally problem described in System for interactive physical exercises using mobile phones—Shot on Goal Optional: Extension to interaction with virtual objects Solution Temporally adaptive learned model for detection and/or classification Event Detection Event detection models may be trained that have the person(s) 2D and/or 3D location, ball 2D and/or 3D location over time as well as environmental features (other object locations, room, ground plane, etc.).

The model inputs can be structured on a fixed temporal grid, passed in sequence.

The inputs can contain any available datapoint (e.g. pose) when available. If due to computational constraints and/or throttling no data is available for a certain timestamp empty, interpolated or extrapolated data can be passed.

The fixed temporal grid ensures a fixed inner clock for the model and allows for interpolation of missing input data The inputs can be normalized to account for different spatial configuration relative to the camera Positional annealing methods such as exponential smoothing can be used to ensure the input data may deviate but stay close to a certain range The model is specifically trained to adapt to varying data input frequencies. The frequencies can vary from device to device, over time on the same device and per component (e.g. ball vs. pose detection) and per sensor on the device (e.g. 30 hz video, 50 hz accelerometer)

For each input the model returns a value indicating whether an event at this timestep is likely The model's outputs can be delayed by a fixed or varying amount to gather information about the future to improve robustness of the detection Thresholding and/or peak detection methods can be used to filter events The event can be further enriched with information of object trajectories using its timestamp State Detection The state of the object (e.g. ball) relative to a person can be e.g. "balancing", "no contact", "holding", etc.

Using the relative position of person, body parts, real and virtual objects over time, the state is determined.

The model inputs and processing can be structured according to the Event Detection Learned Model from above For each state class the model can have a dependent or independent output A hysteresis thresholding method can be used to make the state estimation more robust to noise Event/State Classification model To classify the events/states, other models are trained Object state classification The physical motion model is used to determine if the object is moving consistent with gravity (flying), no gravity (on the ground), or if its movement is not explainable by gravity alone (manipulated, external influence)

Location of interaction detection

Motion models are estimated for person body parts and relevant objects (e.g. a ball) that can determine given trajectories for each participating object where the object the interaction occurred.

Direct indicators might be incoming vs outgoing velocity vector, incoming vs. outgoing object spin, deformation of objects, amount of force applied, reaction of the person, etc.

Combination of physical motion model and learned model

Motion Model+estimation of the intersection point→ see in System for interactive physical exercises using mobile phones—Shot on Goal The motion model vs learned model can be combined by e.g. using motion model output used as an additional input to the Learned Model Robustness Improvements to physical motion model For this ground truth, physical trajectories of objects can be recorded together with noisy measurements that will be available at runtime of the system (e.g. using multiple cameras)

A learned model can be trained to map noisy trajectories to ground truth trajectories of these objects.

The model can be used to de-noise/interpolate/extrapolate data into the motion model.

Combination of augmented reality and physical motion model or learned model

Augmented reality methods are used to build scene understanding of the environment in which the person's actions need to be analyzed.

The system may use plane and/or ground plane detection, 3D scene reconstruction, depth estimation etc.

Based on the 3D location of the object at an event, this can be used to determine if an interaction was between the objects, or between object and environment (e.g. bounce of the ball on the ground plane)

High efficiency on low end hardware [Computational Resource Management]

Volume of Interest

Using domain information and previous detections of objects, as well as scene understanding, the system selects volumes of interest.

A volume of interest consists of a 2D region of interest to crop the image and a depth from which a scale range is determined to indicate to follow up components how to analyze the data.

This information is then passed on to follow up components (e.g. object, pose and action recognition) to focus use of computational resources.

As a specific example, the human pose estimation could only be executed for a region and scale in the image where the ball is expected to be.

Temporally adaptive computation

Using a performance profile of the device, a trade-off problem between number of computations per component and quality of the predictions is formulated.

A system can be created that adaptively maximizes for the maximally possible prediction accuracy given the devices battery, heat and computation constraints (e.g. by training an agent using reinforcement learning).

It can be a part of the learned detection/classification model.

The system decides, based on previous data, whether a new incoming sensor data for a new timestamp should be processed by a certain component.

The adaptively sparsified processed data is then used as input by the detection.

An alternative method can be to fix the frequency of certain components based on empirical benchmarking.

For example the system could decide to accurately classify events to only process the person's pose if a change in the ball's trajectory has been detected. Thus reducing freed up resources from pose estimation that would otherwise run continuously.

Human pose dynamics model

Based on the skeletal model and physically measured and/or simulated properties, a model of a human's pose over time can be estimated.

This model will be updated with measurements and is used to rate the probability of certain events/states and classifications given the current state of the model.

One of the properties of the model can be a weight distribution and/or tension map throughout the skeleton that represents movement potential for the different body parts.

Using this or other methods the standing leg can be determined.

The event classification can be augmented by information on this model (e.g. the standing leg, suggesting that if a kick was detected, the non-standing leg was involved).

Optional Extensions:

Physical model to determine energy transfer

The human pose dynamics model can be extended to model energy transfer.

The movement potential of the model can be used to determine likelihood of a specific effect (resulting trajectory of the object given the interaction with a body part) to detect and filter out events.

Operation 50

Transfer of location information.

In every interaction, the absolute 3D location of the object, and the absolute 3D location of the articulated object's joint, become equal.

This, combined with relative 3D locations of joints, can be used to compute the common/shared/equal absolute 3D location of the secondary object and of the portion of the articulated object that is interacting with the secondary object.

This results in an estimate of the kinematic chain lengths e.g. by estimating distance between absolute joint locations.

The estimate of the kinematic chain lengths may be used in operations 72 and/or 77.

Operation 60

Using results of object tracker or re-identification operation 20, and/or by collecting all the estimates of operation 50, estimate the object's size over time.

Definition:

Tree aka kinematic tree: Modelling the human body as a tree of rigid links is known, where the rigid links include the torso and various limb portions such as upper arm till the elbow, lower leg from the knee down, etc. an example tree is illustrated pictorially in FIG. 4.

Typically, at least one tree, or each tree, comprises only a subset of all possible joint to joint connections. Typically, only those joint-to-joint connections or joint pairs which are distance invariant e.g. always stay at the same distance from one another (e.g. joints on either end of a single bone such as the elbow and wrist joints which are on either end of the lower arm bone), are included in the subset.

Example: a kinematic tree may include only the following 4 joint pairs:

Left shoulder to left elbow
Right shoulder to right elbow
Left elbow to left wrist
Right elbow to right wrist The tree may be stored in digital memory as U, V index mapping e.g. as described below.

The method of operation 60 uses a pair of mappings, where each of the 2 mappings in each pair, maps a connection or joint (typically represented as an index array U[i]) to j, where j is a specific key point from among n key-points.

Lower case I is an index used to denote a given connection i in a kinetic tree modeling a given human body. $1<=i<=m$, with m as the number of connections in the body/tree.

$$P^{6\times 3}$$

Thus P typically comprises a matrix of 6 rows and 3 columns, storing absolute 3D locations per row, with $$U=[1,2,3,4]$$

$$V=[3,4,5,6]$$

As above, the kinematic tree consists of only the following joint pairs or kinematic pairs (aka "pairs of mappings"):

Left shoulder (1) to left elbow (3)
Right shoulder (2) to right elbow (4)
Left elbow (3) to left wrist (5)
Right elbow (4) to right wrist (6).

Thus the U array index stores indices of one joint aka the "starting joint" of the 4 joint pairs in the tree, whereas the V array index stores indices of the other end aka "end joint" of the 4 joint pairs in the tree.

Typically, for index i running from 1 to 4 a joint pair (U[i], V[i]) is a kinematic pair; the two joints are physically connected, and their distance stays the same, irrespective of how the joints are moving in 3D.

The absolute locations P of an articulated object typically each comprise a set of 3D vectors (x, y, z). This set typically represents the absolute 3D location of all or at least some of the joints of the articulated object.

The person size typically is represented as a collection of joint-to-joint lengths which typically includes only a subset of joint to joint lengths, where the lengths in the subset are typically only those for which distances do not change, for example a measurement of left wrist to left elbow may be included as these joints are connected physically, hence distances between them do not change, whereas the distance of left wrist to right wrist is not included in this collection, as the distance between wrists, which are not connected physically, can change arbitrarily.

$$R^m$$

j as above is an index of a specific 3d absolute joint location (aka "key point"). Its value is between 1 and n, as n is the number of 3D absolute joint locations of a person.

The person size vector s_j is defined as the Euclidean Distance between the absolute locations of index arrays U[i] and V[i], for a given connection i in a kinetic tree modeling a given human body. It is appreciated that U is an array of start indices, whereas V is an array of end indices.

Typically, the indication of start/end may be arbitrarily pre-defined e.g. the elbow may be predefined as the "start" of the lower arm, or in another embodiment as the "end" of the lower arm.

Thus the person size vector may be computed as the Euclidean Distance between P[U[i]] and P[V[i]] where, as above, P denotes the absolute locations of an articulated object, where P typically comprises a set of 3D vectors (x, y, z). This set typically represents the absolute 3D location of all or at least some of the joints of the articulated object.

The above operation, operation 60, is performed for each frame in a given video sequence. For each frame, all estimates above are collected.

Thus, when operation 60 is completed for one frame, the output includes (for each tracked person in the video sequence) at least one estimate of the real-life size of that person. Typically, plural estimates of a person's size are collected, e.g. one estimate for each time that this person (say, Rachel) interacts with an object of known size e.g. with a ball of known size, or with a person (say, Joseph) whose size is known, having been derived previously from Joseph's handling of the ball of known size.

Typically, each estimate of a person's size includes plural e.g. m bone length measurements e.g. in meters.

Typically, all persons in the video sequence are tracked, and person size estimates are accumulated for each, where each estimate of a person's size typically includes measurements of certain of the person's bone lengths e.g. in meters.

Typically, and when operation 60 is completed for all frames in the video sequence, the output of operation 60 includes, for each tracked person in the video sequence, a plurality of estimations of that person's size.

At this stage, Operations 72, 77 should be used to find a "best" person size estimate, from among all person size estimates collected in operation 60, over time, i.e. over all frames in the video sequence. Typically, each person size estimate includes measurements of certain of the person's bone lengths e.g. in meters.

Operation 72: Estimate a "Best" Average

Select a "best" measurement for each bone e.g. a median of all available bone measurements (e.g. if plural bone measurements are available, having been derived from respective plural interactions of the relevant joint/s with object/s of known size. Optionally, outliers may be removed.

Example: Bone lengths are typically a distance between the joints on either end of the bone e.g. shoulder to elbow (upper arm bone), or elbow to wrist (lower arm bone).

In this example, two bone lengths are measured: shoulder to elbow and elbow to wrist. 7 estimates are available because the person touched the ball of known size 7 times. The 7 measurements of each of the 2 bones are sorted by size:

[0.1 m, 0.3 m, 0.31 m, 0.32 m, 0.35 m, 1.0 m, 1.2 m] for shoulder to elbow (upper arm); and

[0.2 m, 0.29 m, 0.3 m, 0.34 m, 0.34 m, 0.9 m, 1.4 m] for lower arm (elbow to wrist).

Taking the median would result in a 0.32 m for shoulder to elbow and 0.34 m for elbow to wrist.

A "best" measurement for each bone may optionally be defined as an average bone measurement, e.g. over plural available measurements of that bone, where the average is typically computed disregarding outliers, where outliers are defined as bone measurements whose distance from the closest other measurements is large, compared to the distances between other measurement pairs.

Operation 77

The "best" bone length measurement is then used, computed in operation 72, to scale (e.g. as described below with reference to operation 80) the relative 3D joint locations into absolute 3D joint locations.

Thus, person size, typically comprising a collection of plural lengths along the kinematic chain, is estimated by operations 72, 77. The estimates of kinematic chain lengths generated in operation 50 may be collected e.g. stored digitally, and used in operation 77.

Operation 80

Compute, and provide output indication of, absolute 3D pose, where "pose"=a set of absolute 3D locations for each joint in the body of a tracked person, Sarah.

typically, Sarah's ABSOLUTE 3D POSE =

$$\text{(relative 3D joint locations)} \times \frac{\text{(mean over all estimated kinematic lengths (e.g. all bone lengths)}}{\text{(mean over all kinematic lengths given by the relative 3D joint locations)}}$$

The above typically comprises a matrix of one row per joint, and 3 columns for 3 coordinates. The relative 3D joint locations is also a matrix of the same dimensions, and typically the fraction yields to a single scaling factor.

Typically, absolute 3d location for Sarah's joint J =

$$\text{(relative 3D location of joint } J) \times \frac{\text{(mean over all estimated kinematic lengths (e.g. all bone lengths)}}{\text{(mean over all kinematic lengths given by the relative 3D joint locations e.g. as described in the example below)}}$$

The above equation may be used once for each of Sarah's joints.

The above computation is referred to herein as "simple scaling". An alternative computation using each measured bone length individually is now described by way of example. The example computation below typically yields a "pose" (absolute 3D joint locations).

Example Computation of a "Pose":

In Operation 72, assume by way of example that the following bone lengths have been computed: 0.32 m for shoulder to elbow and 0.34 m for elbow to wrist Now, the relative 3D pose estimator predicts the following relative joint locations which may be provided by operation 10:
[0 m,0 m,0 m] shoulder
[0 m,0 m,0.2 m] elbow
[0 m,0.212 m,0.2 m] wrist.

Since it is known that the directions defined by the above relative joint locations are correct, one needs to select a kinematic root (any joint, e.g. the right shoulder) and start applying the correct directions starting from that kinematic root. e.g. setting Absolute_shoulder_location=Relative_shoulder_location=[0m,0m,0m]

Then, typically, iterate over all chains, e.g. shoulder→elbow, elbow→wrist.

The following two operations (elbow correction and wrist correction) are typically performed for each shoulder→elbow, elbow→wrist chain hence for all such chains (e.g. all such chains for each person at the frame at which the person has touched an object of known size). The operation typically iterates over the person chains, typically starting from the root, in any order.

The above operation pertains to a moment the person has touched an object of known size. Thus, if a person (say) has touched a ball (say) plural times (perhaps 17 times), the above operation is typically executed 17 (say) times.

elbow correction aka Iteration 1: Correct the absolute elbow location e.g. by computing:

Absolute_elbow_location=absolute_shoulder_location [0m,0m,0m]+

+normalized(relative_elbow_location [0 m,0 m,0.2 m]−relative_shoulder_location [0 m,0 m,0 m])*

*(shoulder_to_elbow_length of 0.32 m)

=[0 m,0 m,0.32 m],

Where a 3d vector x, y, z, may be normalized as follows:

normalized($[x,y,z]$)=$[x,y,z]$/sqrt($x*x+y*y+z*z$)

Wrist correction aka Iteration 2: Correct the absolute wrist location e.g. by computing:

Absolute_wrist_location=absolute_elbow_location0 m,0 m,0.32 m+

+normalized(relative_wrist_location [0 m, 0.212 m,0.2 m]−relative_elbow_location [0 m,0 m,0.2 m])*

* elbow to wrist length of 0.34m

=[0 m,0.34 m,0.32 m]

A translation is typically added to or applied to the above-computed absolute locations (e.g. the joint locations after correction thereof). This translation may be found using an iterative camera calibration process.

It is appreciated that the above computation of the absolute location may set the root joint at a location [0 m, 0 m, 0 m], wherein the person is scaled correctly, however the person's position is not correct. Therefore, an optimization process is typically performed to find a 3D translation (e.g. in meters) which minimizes the re-projection error, or to identify a translation vector which aligns the projected 3D pose so as to best match the actual 2D pose in the image.

Optimization may be achieved using a suitable function minimalization method (e.g. a "gradient descent" method) optimizing or minimizing the re-projection error (e.g. distance between 2D pixel locations and projection 2D locations) over the three parameters of the translation.

It is desired to minimize the re-projection error, which (e.g. as described at the following https link: en.wikipedia.org/wiki/Reprojection_error) may be computed as the distance between projected point (absolute 3D locations) and measured joint pixel locations.

The 2D pixel locations may be 2D joint locations from a 2D pose estimation algorithm operative to provide a 2D pose estimation.

It is appreciated that some algorithms (e.g. that described herein with reference to operation 7 provides both a relative 3D pose estimation and a 2D pose estimation.

Or, alternatively, a relative 3D pose estimation may be provided by one algorithm and/or a 2D pose estimation may be provided by another algorithm.

The re-projected 2D locations may be computed by shifting projection 3D joint locations by a translation vector. Typically, the above may be achieved by using an optimization function e.g. as described above, to find an optimal translation subject to minimizing the sum of (project(absolute 3D location+translation)−2D location)$^2$, where "+" denotes shifting.

The global pose computation (3D localization) described on page 9 (supplementary section 3) of "Monocular 3D Human Pose Estimation In The Wild Using Improved CNN Supervision" by Dushyant Mehta et al, available online at the following http location: arxiv.org/pdf/1611.09813v5. pdf, describes a closed-form approximation of this translation vector, see e.g. formula (5) and the formulae 3.1 and 3.2 for x and y respectively, which appear in FIG. 2 herein.

Mehta et al describes inter alia the following, which refers to the equations and expressions of FIG. 3:

"Global Pose Computation 3.1. 3D localization"

A simple, yet very efficient method is described to compute the global 3D location T of a noisy 3D point set P with unknown global position. Scaling and orientation parameters are assumed to be known, obtained from its 2D projection estimate K in a camera with known intrinsic parameters (focal length f). It is further assumed that the point cloud spread in depth direction is negligible compared to its distance z0 to the camera and approximate perspective projection of an object near position (x0, y0, z0)^T with weak perspective projection (linearizing the pinhole projection model at z0), e.g. using Equation 1.

Estimates K and P are assumed to be noisy due to estimation errors. Optimal global position T in the least squares sense are found by minimizing T=arg min(x, y,z) E(x, y, z), with Equation 2, where P i and Ki denote the I'th joint position in 3D and 2D, respectively, and P i [xy] the xy component of P i. It has partial derivative as per equation 3, where P[x] denotes the x part of P, and $P^-$ the mean of P over all joints. Setting Equation 3 to zero (e.g. solving ∂E/∂x=0 gives the unique closed form solutions for x, y provided in Equations 3.1 and 3.2 respectively, for ∂E/∂y=0.

Substitution of x and y in E and differentiating with respect to z yields Equation 4.

Finally, solving ∂E/∂z=0 gives the depth estimate z of Equation 5, where expression 6 is approximated for θ≈0. This is a valid assumption in this case, since the rotation of 3D and 2D pose is assumed to be matching.

Typically, in the above method, z is first solved, and x and y are then computed.

A simpler method which simply applies a scalar for conversion and may replace the above method (the simpler method below being particularly useful e.g. if body proportions may be assumed to be uniform over different persons), is now described:

$$\text{ABSOLUTE 3D POSE} = \frac{(\text{relative 3D joint locations}) \times (\text{mean over all estimated kinematic lengths } (=\text{all estimated bone lengths})}{(\text{mean over all kinematic lengths given by the relative 3D joint locations})}$$

This yields a mean of absolute bone lengths (0.34 m+0.32 m)/2=0.33 m and a mean of relative bone lengths (0.2 m+0.212 m)/2=0.206 m.

It is appreciated that the above computation (performed for just two connections of a kinematic chain by way of example) is performed for all connections along the kinematic chain, resulting in a scale factor of 1.601, computed by dividing 0.33 m [mean absolute bone length] by 0.206 m [mean relative bone length].

Multiplying this scale factor by each of:
[0 m,0 m,0 m] shoulder
[0 m,0 m,0.2 m] elbow
[0 m,0.212 m,0.2 m] wrist results in the following "pose" (absolute 3D locations for the following 3 joints respectively):
[0 m,0 m,0 m] shoulder (because the right shoulder is the selected kinematic root
[0 m,0 m,0.32 m] elbow
[0 m,0.34 m,0.32 m] wrist It is appreciated that it may be desired to compute the absolute location of an object e.g. person, who never once, throughout the video sequence, interacts with the/a object y of known size. However, typically, the method herein may be used to determine the absolute location and/or size of any object x' which does interact, at sometime within the video sequence, with the object y of known size. Then, those locations may be used to determine the absolute location and/or size of any object x" which does interact, at sometime within the video sequence, with any object x'. Then, the absolute locations of object/s x" may be used to determine absolute locations and/or size of any object x'" which does interact, at any time within the video sequence, with any object x", and so forth, until absolute locations of even those objects which never once, throughout the video sequence, interact with the/a object y of known size, become known.

It is appreciated that all or any subset of operations 5-80 may be performed on a single image depicting interacting objects. However, if the operations are performed on a video sequence of images, this improves accuracy by gathering multiple estimates over time, and then combining these estimates in any suitable manner e.g. by averaging, either over all estimates or over whichever estimates remain after outlying estimates are disregarded. Using video data, the sequential absolute positions of an object x whose relative locations to other objects in the video sequence are known, may be computed, by detecting interactions of object x with any object y whose absolute locations are known (e.g. having previously been computed using the method shown and described herein).

Operation 90 (Example Use-Cases)

Use the absolute 3D pose output (which typically includes absolute 3D locations for each (or at least one) joint in each tracked person's body) generated in operation 80, for use cases such as but not limited to estimating positions of persons in a video (e.g. basketball players in a broadcast video) or detecting speed of a person in a video sequence (e.g. a person who is handling a ball). A particular advantage is that the method corrects for person size, thereby correctly handling both children & adults, rather than, for example, confounding children at a distance x from the camera, with adults at a distance X>x from the camera.

Many different uses may be made of the methods shown and described herein. For example, in some embodiments, e.g. for consumer analytics, the method herein allows an adult who has approached the window (hence is engaged with the displayed wares) to be distinguished from a child who is far from (hence not engaged with) the displayed wares, or, more generally, the method prevents the distance between consumer and wares to be computed without that distance being confounded with the size of the consumer.

Or, in some embodiments, movement speeds of different body joints may be computed e.g. to "diagnose" an athlete's kicking speed or punching speed, based on the absolute 3D location of her or his wrists and ankles as computed using the methods herein. Kicking or punching speed in term allows other athlete characteristics to be identified, e.g. whether the athlete or fighter is more of a kicker or a puncher, or how dominant the fighter's left/right side is. Any suitable method may be employed to compute the speed of an athlete's limbs, based on the athlete's absolute 3D pose.

Joint speed may be computed conventionally, by computing distances between a joint's (typically absolute) 3D locations over time and dividing by the time period separating sequential locations.

A person's speed may be computed by computing the average speed of all or some of her or his joints. Note that selection of which joints are employed, depends on the use case. For example, if a person is walking, s/he tends to swing her or his arms back and forth, therefore when computing walking speed, the following joint speeds may for example be average: hips, shoulders, face, whereas the speeds of the elbows and wrists would typically not be used.

Individual speed of individual joints may be used, for example, to anticipate based on the fact that a person has moved her or his shoulders forward, that the person is about to move, even though his feet still have a speed of zero.

Basketball player positions may be used as an input to other analytics detecting interesting moments, for example tactical situations where there is an increased possibility of a goal e.g. because players are approaching the goalpost. This is indicative of upcoming possible 'exciting' moments in a game, and thus, the basketball player positions may be used to notify users, e.g. via apps, that something interesting has happened or is about to happen. Determining exciting moments may also involve deducing a basketball (say) player's intent, e.g. analyzing if s/he is moving fast towards the goal, which may be indicative of an intent to attack which may be deemed an exciting moment, whereas movement toward the goalpost at a slow speed may be indicative of the player's waiting for a particular moment to move towards the other team's position, which may not be deemed an exciting moment.

Other use cases may include all or any subset of the following:

In consumer mobile apps, knowing the person location can give rise to analytics deriving the 3D motion of the person, and leveraging analytics where the person interacts with other objects such as a soccer ball. This can be used e.g. for detecting juggling, joggling/tricks with a ball in a single to multi-player setup.

For health care, 3D absolute positions can be used to distinguish right posture from wrong, or abnormal gait from normal gait.

Customers' position and size may be used to determine if they are engaged in the shopping window display. Here, having an accurate size and position can distinguish between small persons and persons further away. Alternatively or in addition, given the person's size, analytics on customer demographics, such as categorizing customers as being children vs adults, can be created.

An Automated driving or driving assistant can use the person position and person size to detect possible impacts, provide collision avoidance, and warn for dangerous situations.

According to certain embodiments, athlete positions in upcoming frames are predicted, and virtual ads are positioned accordingly, so as not to obscure these players, by placing the virtual ads in (absolute or relative) locations other than the predicted player positions in upcoming frames.

According to certain embodiments, a system for accurate 3D pose estimation is provided which includes logic configured for using a 3D pose estimation from image and/or other 3D localization techniques, to determine e.g. 3D positions based on interactions with object/s e.g. balls having known size (and/or ground floor estimation), e.g. using sensors on a phone, and/or an action recognition framework; as described herein. An action recognition framework may be used to detect interactions between objects e.g. to recognize an interaction of a joint of an articulated object, e.g. person, with an object of known size.

For example, a phone's accelerometer may yield an acceleration vector pointing downwards towards the center of the Earth. Therefore, a floor plane is perpendicular to this vector. The ground plane may be parameterized based on a perpendicular vector and distance of the ground plane from the coordinate system's origin. The origin may be arbitrarily defined. For example, the origin maybe defined as the camera's position in the first frame, or the point on the floor that the camera is facing in the first frame). the accelerometer vector may be used as a constraint in fitting the ground-plane e.g., as in the two references cited below, the ground-plane may be estimated by multiple sensors, where each sensor adds a constraint or information that can be used in finding the best fit.

It is appreciated that any suitable method may be employed for fusing sensor data with visual data to estimate orientation of a ground plane, such as but not limited to, the methods described in the following https links:

ap.isr.uc.pt/wp-content/uploads/mrl_data/archive/124.pdf;

www.ncbi.nlm.nih.gov/pmc/articles/PMC5676736/.

Notably in the latter (nih) reference, accelerometer, gyroscope and visual data are all fused together and a Kalman filter takes care of all the sensor noises e.g. as described in the following https link: www.instructables.com/id/Accelerometer-Gyro-Tutorial/.

Typically, the accelerometer is not solely relied upon, since as a sensor it may be noisy. Instead, multiple phone sensor measurements, typically accumulated over time, may be used to correct, say, ground plane orientation, using, say, rotations estimated by the phone's gyroscope e.g. as described at the following https links:

ap.isr.uc.pt/wp-content/uploads/mrl_data/archive/124.pdf;

www.ncbi.nlm.nih.gov/pmc/articles/PMC5676736/.

According to certain embodiments, a phone camera images the objects whose size and/or position is to be estimated, and that phone's sensor/s e.g. accelerometer is used e.g. as above.

According to certain embodiments, the method herein is performed as a streaming method, in which frames are processed one after the other. Typically, if no knowledge about size is known (e.g. if A interacts with B but B's size is not known), no knowledge is passed, and no person size estimate is computed.

According to another possible embodiment, data regarding an interaction between A and B in frame f may be stored even if neither A's size nor B's is known, since the size of A (say) may be derivable from frame/s later than f which would then enable the size of B to be derived retroactively from the size of A, known from the later frame/s, in conjunction with the stored data regarding the interaction between A and B which occurred in frame f.

it is appreciated that, typically, for at least one frame, or all frames, in which a person (say) is touching a ball (say) whose location and/or size are known, the absolute 3D locations of the joint touching or closest to the ball, and of the ball itself, are assumed to be equal. Given this assumption, the relationship between the absolute 3D location of the ball and the 2D joint location may be determined e.g. using a suitable camera projection equation or system of equations e.g. that presented herein.

It is appreciated that fixed sizes characterizing an object o1 e.g. person (e.g. the actual distance between the person's right wrist and elbow, which is known to remain fixed between frames as opposed to the distance between that person's right and left wrists which does not remain fixed) may be measured, for use e.g. as described herein, in converting relative 3D joint locations, belonging to that object o1 e.g. person, to absolute 3D joint locations for object o1, in frames which may even include frames in which the object o1 e.g. person is not interacting with, or is not in direct contact with, an object o2 having a 3D absolute location and/or size which are known. Alternatively or in addition, measuring such distances is useful for estimating o1's size or body proportions.

a particular advantage of certain methods herein is that averaging is performed on measured person sizes e.g. measured bone lengths, rather than averaging over 3D locations which would undesirably average out any motions of the bones.

It is appreciated that terminology such as "mandatory", "required", "need" and "must" refer to implementation choices made within the context of a particular implementation or application described herewithin for clarity, and are not intended to be limiting, since, in an alternative implementation, the same elements might be defined as not mandatory, and not required, or might even be eliminated altogether.

Components described herein as software may, alternatively, be implemented wholly or partly in hardware and/or firmware, if desired, using conventional techniques, and vice-versa. Each module or component or processor may be centralized in a single physical location or physical device, or distributed over several physical locations or physical devices.

Included in the scope of the present disclosure, inter alia, are electromagnetic signals in accordance with the description herein. These may carry computer-readable instructions for performing any or all of the operations of any of the methods shown and described herein, in any suitable order, including simultaneous performance of suitable groups of operations as appropriate. Included in the scope of the present disclosure, inter alia, are machine-readable instructions for performing any or all of the operations of any of the methods shown and described herein, in any suitable order; program storage devices readable by machine, tangibly embodying a program of instructions executable by the machine to perform any or all of the operations of any of the methods shown and described herein, in any suitable order i.e. not necessarily as shown, including performing various operations in parallel or concurrently rather than sequentially as shown; a computer program product comprising a computer useable medium having computer readable program code, such as executable code, having embodied therein, and/or including computer readable program code for performing any or all of the operations of any of the methods shown and described herein, in any suitable order; any technical effects brought about by any or all of the operations of any of the methods shown and described herein, when performed in any suitable order; any suitable apparatus or device or combination of such, programmed to perform, alone or in combination, any or all of the operations of any of the methods shown and described herein, in any suitable order; electronic devices each including at least one processor and/or cooperating input device and/or output device and operative to perform e.g. in software any operations shown and described herein; information storage devices or physical records, such as disks or hard drives, causing at least one computer or other device to be configured so as to carry out any or all of the operations of any of the methods shown and described herein, in any suitable order; at least one program pre-stored e.g. in memory or on an information network such as the Internet, before or after being downloaded, which embodies any or all of the operations of any of the methods shown and described herein, in any suitable order, and the method of uploading or downloading such, and a system including server/s and/or client/s for using such; at least one processor configured to perform any combination of the described operations or to execute any combination of the described modules; and hardware which performs any or all of the operations of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any operation or functionality described herein may be wholly or partially computer-implemented e.g. by one or more processors. The invention shown and described herein may include (a) using a computerized method to identify a solution to any of the problems or for any of the objectives described herein, the solution optionally includes at least one of a decision, an action, a product, a service or any other information described herein that impacts, in a positive manner, a problem or objectives described herein; and (b) outputting the solution.

The system may, if desired, be implemented as a web-based system employing software, computers, routers and telecommunications equipment, as appropriate.

Any suitable deployment may be employed to provide functionalities e.g. software functionalities shown and described herein. For example, a server may store certain applications, for download to clients, which are executed at the client side, the server side serving only as a storehouse. Any or all functionalities e.g. software functionalities shown and described herein may be deployed in a cloud environment. Clients e.g. mobile communication devices such as smartphones may be operatively associated with but external to the cloud.

The scope of the present invention is not limited to structures and functions specifically described herein and is also intended to include devices which have the capacity to yield a structure, or perform a function, described herein, such that even though users of the device may not use the capacity, they are, if they so desire, able to modify the device to obtain the structure or function.

Any "if-then" logic described herein is intended to include embodiments in which a processor is programmed to repeatedly determine whether condition x, which is sometimes true and sometimes false, is currently true or false and to perform y each time x is determined to be true, thereby to yield a processor which performs y at least once, typically on an "if and only if" basis e.g. triggered only by determinations that x is true and never by determinations that x is false.

Any determination of a state or condition described herein, and/or other data generated herein, may be harnessed for any suitable technical effect. For example, the determination may be transmitted or fed to any suitable hardware, firmware or software module, which is known, or which is described herein to have capabilities to perform a technical operation responsive to the state or condition. The technical operation may for example comprise changing the state or condition, or may more generally cause any outcome which is technically advantageous given the state or condition or data, and/or may prevent at least one outcome which is disadvantageous given the state or condition or data. Alternatively, or in addition, an alert may be provided to an appropriate human operator, or to an appropriate external system.

Features of the present invention, including operations which are described in the context of separate embodiments, may also be provided in combination in a single embodiment. For example, a system embodiment is intended to include a corresponding process embodiment and vice versa. Also, each system embodiment is intended to include a server-centered "view" or client centered "view", or "view" from any other node of the system, of the entire functionality of the system, computer-readable medium, apparatus, including only those functionalities performed at that server or client or node. Features may also be combined with features known in the art and particularly although not limited to those described in the Background section or in publications mentioned therein.

Conversely, features of the invention, including operations, which are described for brevity in the context of a single embodiment or in a certain order may be provided separately or in any suitable subcombination, including with features known in the art (particularly although not limited to those described in the Background section or in publications mentioned therein) or in a different order. "e.g." is used herein in the sense of a specific example which is not intended to be limiting. Each method may comprise all or any subset of the operations illustrated or described, suitably ordered e.g. as illustrated or described herein.

Devices, apparatus or systems shown coupled in any of the drawings may in fact be integrated into a single platform in certain embodiments or may be coupled via any appropriate wired or wireless coupling such as but not limited to optical fiber, Ethernet, Wireless LAN, HomePNA, power line communication, cell phone, Smart Phone (e.g. iPhone), Tablet, Laptop, PDA, Blackberry GPRS, Satellite including GPS, or other mobile delivery. It is appreciated that in the description and drawings shown and described herein, functionalities described or illustrated as systems and sub-units thereof can also be provided as methods and operations therewithin, and functionalities described or illustrated as methods and operations therewithin can also be provided as systems and sub-units thereof. The scale used to illustrate various elements in the drawings is merely exemplary and/or appropriate for clarity of presentation and is not intended to be limiting.

Any suitable communication may be employed between separate units herein e.g. wired data communication and/or in short-range radio communication with sensors such as cameras e.g. via WiFi, Bluetooth or Zigbee.

It is appreciated that implementation via a cellular app as described herein is but an example, and, instead, embodiments of the present invention may be implemented, say, as a smartphone SDK; as a hardware component; as an STK application, or as suitable combinations of any of the above.

Any processing functionality illustrated (or described herein) may be executed by any device having a processor, such as but not limited to a mobile telephone, set-top-box, TV, remote desktop computer, game console, tablet, mobile e.g. laptop or other computer terminal, embedded remote unit, which may either be networked itself (may itself be a node in a conventional communication network e.g.) or may be conventionally tethered to a networked device (to a device which is a node in a conventional communication network or is tethered directly or indirectly/ultimately to such a node).

The invention claimed is:

1. A system for estimating an absolute 3D location of at least one object x imaged by a single camera, the system including:
   processing circuitry configured for identifying an interaction, at time t, of object x with an object y imaged with said object x by said single camera,
   including logic for determining object y's absolute 3D location at time t, and providing an output indication of object x's absolute location at time t, derived from the 3D location, as known, at time t, of object y,
   wherein said logic comprises computer readable program code adapted to be executed to implement a method, said method comprising using a hardware processor for performing, at least once, all or any subset of the following operations:
   a) providing relative 3D joint locations for object x having joints J whose absolute locations are of interest;
   b) providing absolute 3D locations of at least one object y, which is imaged by said single camera and whose size is known;
   c) re-identifying objects x, y over time;
   d) recognizing interaction of object x as re-identified in operation c), with said object y of known size as re-identified in operation c);
   e) for each interaction recognized in operation d),
      finding absolute 3D location L of object y with known size, at time T at which interaction occurred;
      setting absolute 3D location of joint J to be L;
      using relative 3D locations as provided in operation a of at least one joint k other than J relative to 3D location of joint J, to compute absolute 3D locations of joint k, given the absolute location L of J as found; and
      determining distances between absolute 3D locations of various joints k, to yield an object size parameter comprising an estimated length of a limb portion extending between joints j and k;
   f) computing a best-estimate from the object sizes estimated in operation e), for each tracked limb portion;
   g) using said best-estimate to scale relative 3D joint locations into absolute 3D joint locations; and
   h) generating an output indication of said absolute 3D joint locations.

2. The system according to claim 1, wherein said object x comprises a first joint interconnected via a limb of fixed length to a second joint and wherein the system determines said fixed length and then determines said second joint's absolute 3D location at time t to be a location L whose distance from object x's absolute location at time t, is said fixed length.

3. A method for providing an output indication of absolute 3D locations of objects imaged by a single camera, the method including using a hardware processor for performing, at least once, the following operations:
   a) providing relative 3D joint locations for an object x having joints J whose absolute locations are of interest;
   b) providing absolute 3D locations of at least one object y, which is imaged by said single camera and whose size is known;
   c) re-identifying objects x, y over time;
   d) recognizing interaction of object x as re-identified in operation c), with said object y of known size as re-identified in operation c);
   e) for each interaction recognized in operation d),
      finding absolute 3D location L of object y with known size, at time T at which interaction occurred,
      setting absolute 3D location of joint J to be L;
      using relative 3D locations as provided in operation a of at least one joint k other than J relative to 3D location of joint J, to compute absolute 3D locations of joint k, given the absolute location L of J as found; and
      determining distances between absolute 3D locations of various joints k, to yield an object size parameter comprising an estimated length of a limb portion extending between joints j and k;
   f) computing a best-estimate from the object sizes estimated in operation e), for each tracked limb portion;
   g) using said best-estimate to scale relative 3D joint locations into absolute 3D joint locations; and
   h) generating an output indication of said absolute 3D joint locations.

4. The method according to claim 3, wherein said object y is a stationary object having a permanent absolute 3D location which is stored in memory.

5. The method according to claim 3, wherein said object y comprises a ball, and wherein data is pre-stored regarding the ball's known conventional size.

6. The method according to claim 3, wherein in operation c), said re-identifying objects comprises tracking said objects.

7. The method according to claim 3, wherein in operation f), said computing of a best-estimate includes removing outliers which differ from a cluster of estimates to a greater extent, relative to the extent to which the estimates in the cluster differ among themselves.

8. The method according to claim 3, wherein said method is performed in near-real time.

9. The method according to claim 3, wherein in operation h), said output indication serves as an input to a processor which identifies interesting moments in the single camera's output and alerts end-users of said interesting moments.

10. The method according to claim 3, wherein in operation h), said output indication serves as an input to a processor which controls insertions of virtual advertisements.

11. The method according to claim 3, wherein said object y comprises an object O whose absolute 3d joint locations are known from operation h) by virtue of having previously derived absolute 3D locations of object O's joints by performing said operations a)-h).

12. The method according to claim 3, wherein said output indication may be sensed by a human user.

13. The system according to claim 1, wherein said determining object y's absolute 3D location comprises retrieving object y's absolute 3d location from memory, because object y's absolute 3D location is known to the system.

14. The system according to claim 1, wherein said processing circuitry is also configured for:
generating plural estimates of object x's size for plural interactions respectively,
finding a best estimate from among said estimates, over time, and
using said best estimate to estimate the absolute 3D location, thereby to handle situations in which object-joint distance is not exactly 0.

15. The system according to claim 1, wherein said object x's absolute location at time t is estimated as being equal to the 3D location, as known, at time t, of object y.

16. The system according to claim 1, wherein said object y's size is known and wherein said logic uses knowledge about said object y's size to derive said object x's absolute location at time t.

17. A computer program product, comprising a non-transitory tangible computer readable medium having computer readable program code embodied therein, said computer readable program code adapted to be executed to implement a method, said method comprising using a hardware processor for performing, at least once, all or any subset of the following operations:
a) providing relative 3D joint locations for an object x having joints J whose absolute locations are of interest;
b) providing absolute 3D locations of at least one object y, which is imaged by a single camera and whose size is known;
c) re-identifying objects x, y over time;
d) recognizing interaction of object x as re-identified in operation c, with said object y of known size as re-identified in operation c);
e) for each interaction recognized in operation d),
finding absolute 3D location L of object y with known size, at time T at which interaction occurred;
setting absolute 3D location of joint J to be L;
using relative 3D locations as provided in operation a of at least one joint k other than J relative to 3D location of joint J, to compute absolute 3D locations of joint k, given the absolute location L of J as found; and
determining distances between absolute 3D locations of various joints k, to yield an object size parameter comprising an estimated length of a limb portion extending between joints j and k;
f) computing a best-estimate from the object sizes estimated in operation e), for each tracked limb portion;
g) using said best-estimate to scale relative 3D joint locations into absolute 3D joint locations; and
h) generating an output indication of said absolute 3D joint locations.

18. The system according to claim 1, wherein at least one fixed size, known to remain fixed between frames, which characterizes object x is used for converting object x's relative 3D joint locations to absolute 3D joint locations for object x.

19. The system according to claim 18, wherein said fixed size comprises an actual distance between two connected joints belonging to object x.

20. The system according to claim 18, wherein said converting is performed for at least one frame in which object x is not interacting with object y.

* * * * *